United States Patent
Yu

(10) Patent No.: US 10,088,044 B2
(45) Date of Patent: Oct. 2, 2018

(54) ELECTRONIC PARKING BRAKE ACTUATOR

(71) Applicant: LG INNOTEK CO., LTD., Seoul (KR)

(72) Inventor: Byeong Jong Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/682,303

(22) Filed: Apr. 9, 2015

(65) Prior Publication Data
US 2015/0292619 A1  Oct. 15, 2015

(30) Foreign Application Priority Data
Apr. 9, 2014 (KR) .................. 10-2014-0042474

(51) Int. Cl.
*F16H 63/34* (2006.01)
*F16H 57/08* (2006.01)
(Continued)

(52) U.S. Cl.
CPC ........ *F16H 63/3466* (2013.01); *B60T 13/746* (2013.01); *F16D 65/16* (2013.01);
(Continued)

(58) Field of Classification Search
CPC .... F16H 63/3466; F16H 57/023; F16H 57/08; F16H 1/2818; F16H 63/3458;
(Continued)

(56) References Cited

U.S. PATENT DOCUMENTS 3,052,138 A * 9/1962 Louton, Jr. ............ F16H 1/32
475/176
4,617,839 A  10/1986 Matoba
(Continued)

FOREIGN PATENT DOCUMENTS

CN  101395400  3/2009
CN  102762882  10/2012
(Continued)

OTHER PUBLICATIONS

European Search Report dated Sep. 2, 2015 issued in Application No. 15162926.8.
(Continued)

*Primary Examiner* — Robert W Hodge
*Assistant Examiner* — Lori Wu
(74) *Attorney, Agent, or Firm* — KED & Associates, LLP

(57) ABSTRACT

A parking brake actuator includes a motor, a power transfer assembly or gearing connected to an output shaft of the motor, a planetary gear set including a linear gear connected to the power transfer assembly, a planetary gear engaged with the linear gear, and a ring gear engaged with the planetary gear and including an insertion protrusion formed on a bottom, and a housing including a motor seating recess in which the motor is accommodated and a ring gear seating in which the ring gear is accommodated, in which the ring gear accommodating portion includes an insertion groove formed on a bottom surface into which the insertion protrusion is forcibly inserted.

8 Claims, 5 Drawing Sheets

(51) Int. Cl.
*F16H 57/023* (2012.01)
*B60T 13/74* (2006.01)
*F16D 65/16* (2006.01)
*F16D 125/50* (2012.01)
*F16D 121/24* (2012.01)
*F16D 125/48* (2012.01)

(52) U.S. Cl.
CPC ............ *F16H 57/023* (2013.01); *F16H 57/08* (2013.01); *F16D 2121/24* (2013.01); *F16D 2125/48* (2013.01); *F16D 2125/50* (2013.01)

(58) Field of Classification Search
CPC ...... F16H 63/3416; F16H 63/34; F16H 63/30; F16H 63/20; F16H 63/00; B60T 13/746; F16D 2125/50
See application file for complete search history.

(56) References Cited

U.S. PATENT DOCUMENTS

| | | | | |
|---|---|---|---|---|
| 9,410,590 B2* | 8/2016 | Jang | ..................... | H02K 7/116 |
| 2009/0050420 A1* | 2/2009 | Poertzgen | ............. | B60T 13/746 |
| | | | | 188/156 |
| 2010/0261572 A1* | 10/2010 | Riester | ..................... | F16H 1/46 |
| | | | | 475/331 |
| 2010/0292043 A1* | 11/2010 | Tao | ......................... | F16H 57/08 |
| | | | | 475/344 |
| 2010/0320041 A1 | 12/2010 | Seuser et al. | | |
| 2011/0147143 A1* | 6/2011 | Park | ..................... | B60T 13/746 |
| | | | | 188/158 |
| 2013/0048394 A1* | 2/2013 | Su | ......................... | B60K 7/0007 |
| | | | | 180/60 |
| 2013/0269305 A1* | 10/2013 | Wang | ..................... | A01D 34/00 |
| | | | | 56/14.7 |
| 2014/0034430 A1* | 2/2014 | Fuse | ..................... | F16D 55/226 |
| | | | | 188/72.4 |
| 2014/0090933 A1* | 4/2014 | Sakashita | .............. | F16D 55/226 |
| | | | | 188/72.4 |
| 2014/0135166 A1* | 5/2014 | Wang | ......................... | F16H 1/46 |
| | | | | 475/337 |
| 2015/0075923 A1* | 3/2015 | Jang | ..................... | B60T 13/746 |
| | | | | 188/156 |
| 2015/0210253 A1* | 7/2015 | Qi | ......................... | B60T 13/741 |
| | | | | 188/162 |

FOREIGN PATENT DOCUMENTS

| | | | | |
|---|---|---|---|---|
| DE | 10 2008 058098 A1 | 5/2009 | | |
| DE | 10-2013-103892 | 10/2013 | | |
| JP | 2011-027219 | 2/2011 | | |
| KR | 10-1321719 | 10/2013 | | |
| WO | WO2015/151052 | * | 8/2015 | .............. B60T 13/74 |

OTHER PUBLICATIONS

Chinese Office Action dated Jan. 29, 2018 issued in Application No. 201510166009.4 (with English Translation).

* cited by examiner

ELECTRONIC PARKING BRAKE ACTUATOR

CROSS-REFERENCE TO RELATED APPLICATION

This application claims priority under 35 U.S.C. § 119 to Korean Application No. 10-2014-0042474 filed on Apr. 9, 2014, whose entire disclosure is hereby incorporated by reference.

BACKGROUND

1. Field

The present disclosure relates to an electronic parking brake actuator, and more particularly, to an electronic parking brake actuator including a planetary gear set.

2. Background

An electronic parking brake (EPB) is an apparatus electronically control the driving of a parking brake. The EPB is installed on a general disc brake and performs a parking brake function. To operate the EPB, an additional actuator is necessary. The actuator of the EPB includes a motor installed inside a housing and a gear assembly for transferring power and reducing speed is disposed on an output shaft of the motor.

The gear assembly may include a planetary gear set for changing speed. The planetary gear set may include a sun gear coupled with a shaft, a plurality of planetary gears engaged with a circumference of the sun gear, and a ring gear engaged with the planetary gear. The ring gear is fixed inside the housing. In general, a coupling rib is formed to protrude from an outer circumferential surface of the ring gear, a slot is formed inside the housing, and the coupling rib is inserted into the slot, thereby mounting the ring gear on the housing.

Considering a state of the ring gear which continuously receives torque and a tolerance with respect to the slot of the housing which is injection-molded, a gap may occur between the coupling rib and the slot in a configuration in which the coupling rib slides on the slot. When a gap occurs between the ring gear and the housing, the performance and durability of a product may have serious defects.

BRIEF DESCRIPTION OF THE DRAWINGS

The embodiments will be described in detail with reference to the following drawings in which like reference numerals refer to like elements wherein.

DETAILED DESCRIPTION

Figure 1:
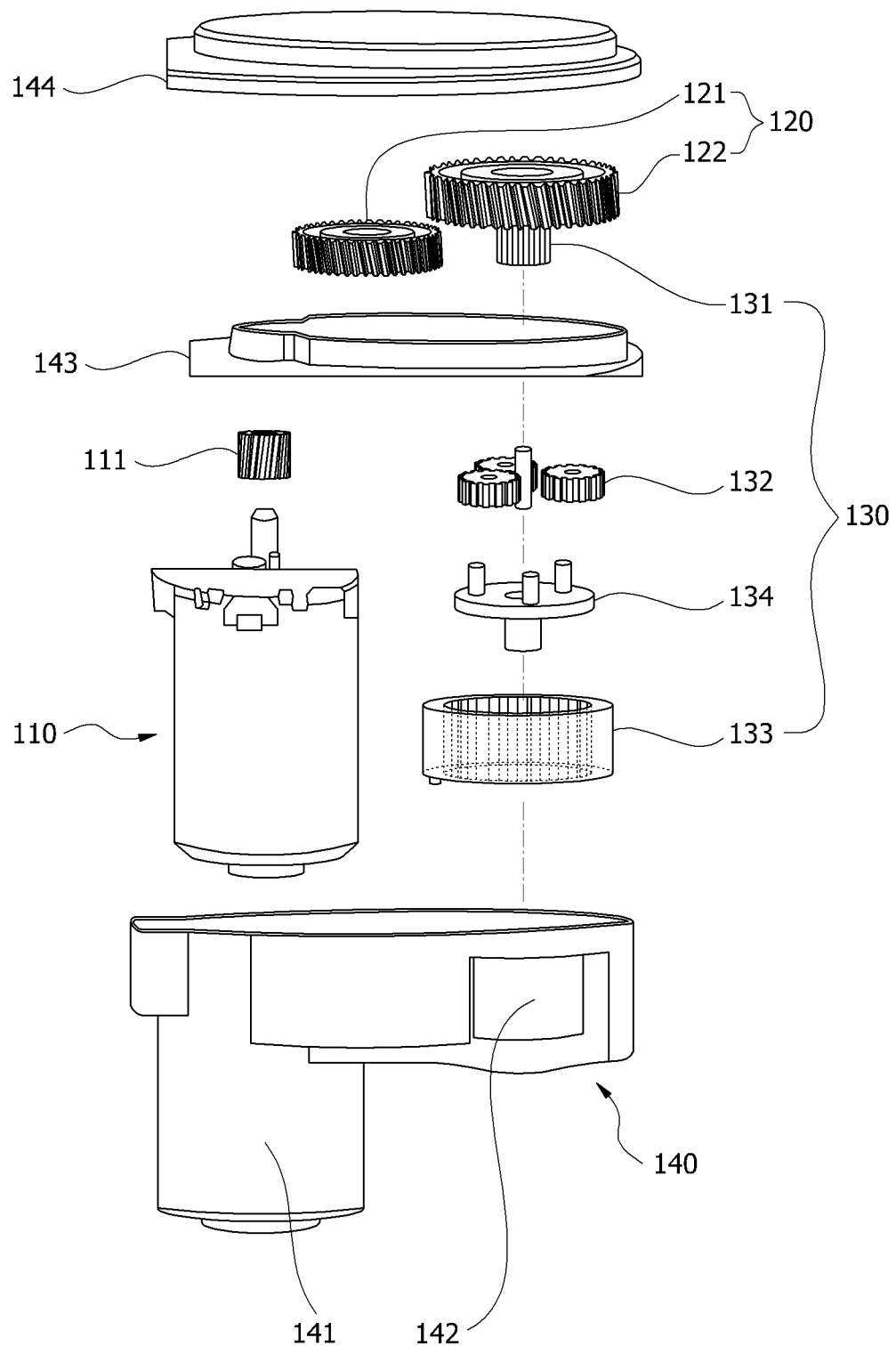
FIG. 1 is a view of a parking brake actuator according to an embodiment of the present disclosure.
Figure 2:
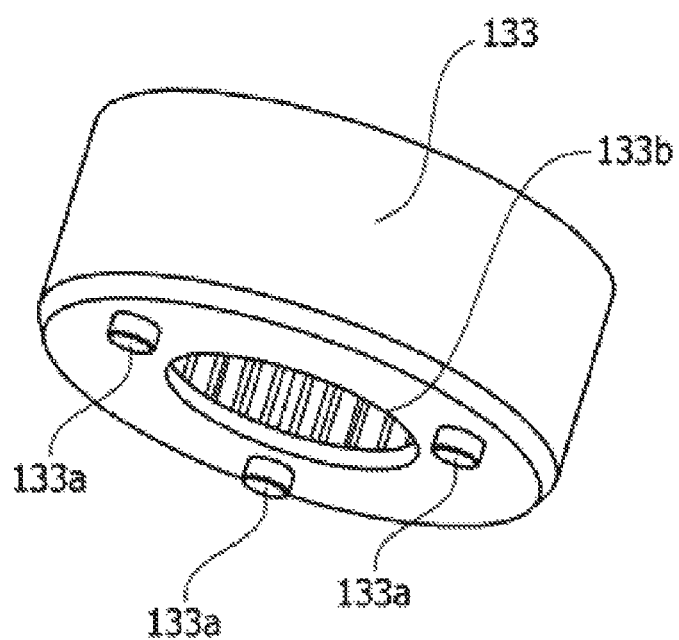
FIG. 2 is a view of an insertion protrusion of a ring gear shown in FIG. 1.
Figure 3:
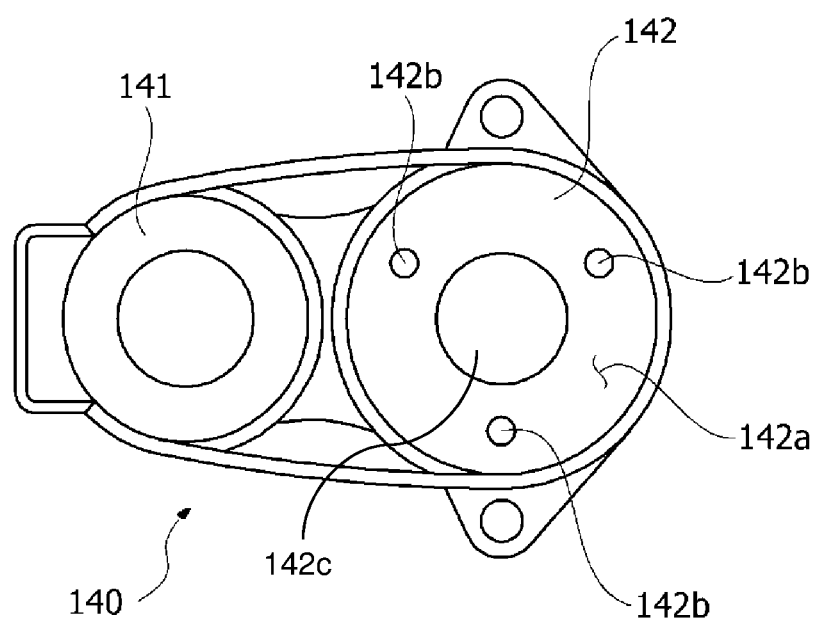
FIG. 3 is a view of an insertion groove of a housing shown in FIG. 1.

FIG. 1 is a view of a parking brake actuator according to an embodiment of the present disclosure. FIG. 2 is a view of an insertion protrusion (or "protrusion") 133*a* and a hole 133*b* of a ring gear 133 shown in FIG. 1. FIG. 3 is a view of an insertion groove (or "groove") 142*b* of a housing 140 shown in FIG. 1. There is provided a technical feature in which an insertion protrusion is formed on a bottom of a ring gear through injection molding and forcibly inserted into an insertion groove formed on a bottom surface of a ring gear accommodating portion of a housing, thereby preventing a gap between the ring gear and the housing.

FIGS. 1 to 3 illustrate significant parts to allow the present disclosure to be understood. As a result, various modifications in views may exist and the scope of the present disclosure will not be limited to particular shapes shown in the drawings. The parking brake actuator may include a motor 110, a power transfer assembly or gears 120, a planetary gear set 130, and the housing 140. The parking brake actuator may provide a parking brake with power causing a braking force.

In detail, the torque of the motor 110 may be transferred to a spindle of the parking brake through the power transfer assembly or gearing 120 and the planetary gear set 130. When the spindle rotates due to the power of the motor 110, a piston is pressurized and a pad and a disc rub against each other, thereby generating the braking force.

The motor 110 includes a shaft rotatably formed, a rotor coupled with the shaft, and a stator fixed inside the housing, in which the stator may be installed along a circumference of the rotor with a gap. A coil which forms a rotational magnetic field is wound on the stator and causes an electric interaction with the rotor, thereby inducing the rotation of the rotor. When the rotor rotates, the shaft rotates and transfers power necessary for a braking force to the spindle of the parking brake.

The power transfer assembly 120 is connected to an output shaft of the motor 110 and transfers the power of the motor 110 to the planetary gear set 130. In one embodiment, the power transfer assembly 120 may include an idle gear 121 and a drive gear 122. The idle gear 121 is engaged with a pinion gear 111 connected to the shaft of the motor 110. The drive gear 122 rotates while being engaged with the idle gear 121. A sun gear 131 may be coupled below with the drive gear 122 as a double gear.

The planetary gear set 130 shifts the power received from the power transfer assembly 120 to the spindle of the parking brake. In one embodiment, the planetary gear set 130 may include the sun gear 131, planetary gears 132, the ring gear 133, and a carrier 134.

The gear 131 and the drive gear 122 are formed to be a double gear. In other words, the sun gear 131 and the drive gear 122 have the same shaft. And the drive gear 122 receives the torque of the motor 110. The three planetary gears 132 are disposed along a circumference of the sun gear 131 to be engaged therewith simultaneously with being engaged with the ring gear 133. The planetary gears 132 are supported by the carrier 134. The ring gear 133 is fixed to the housing 140.

Figure 4:
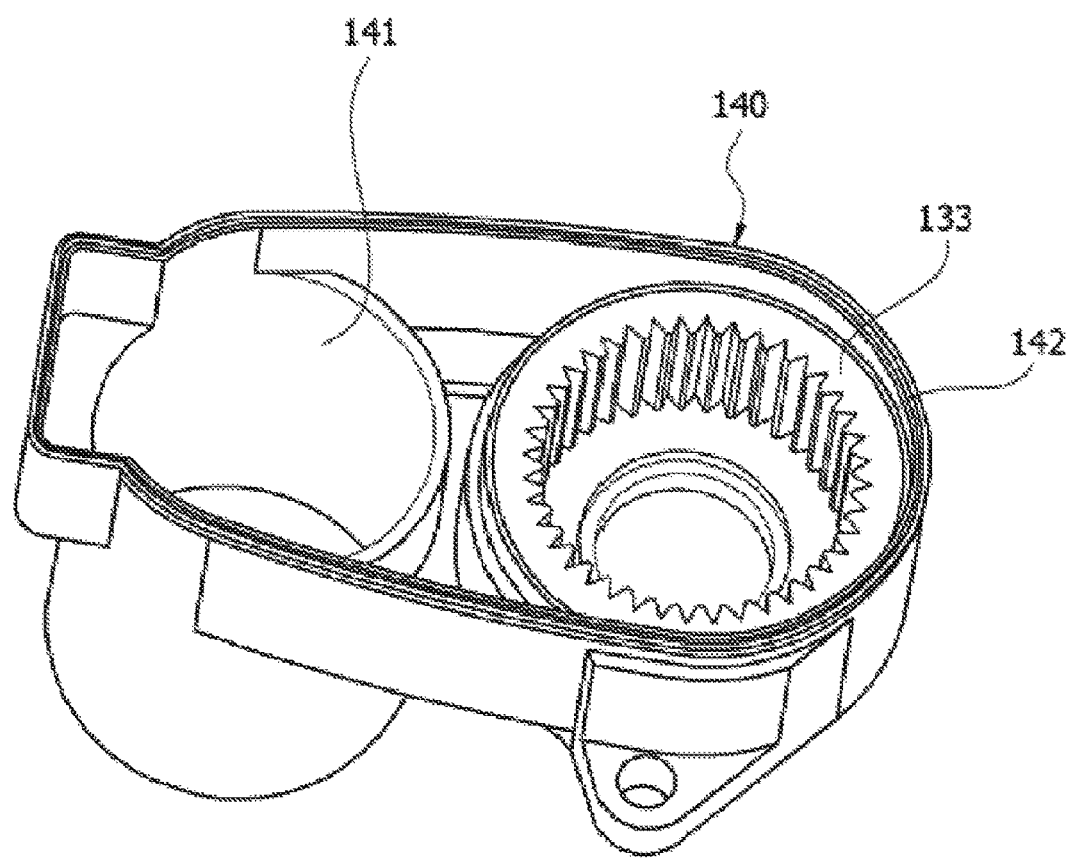
FIG. 4 is a view of the housing mounted with the ring gear.
Figure 5:
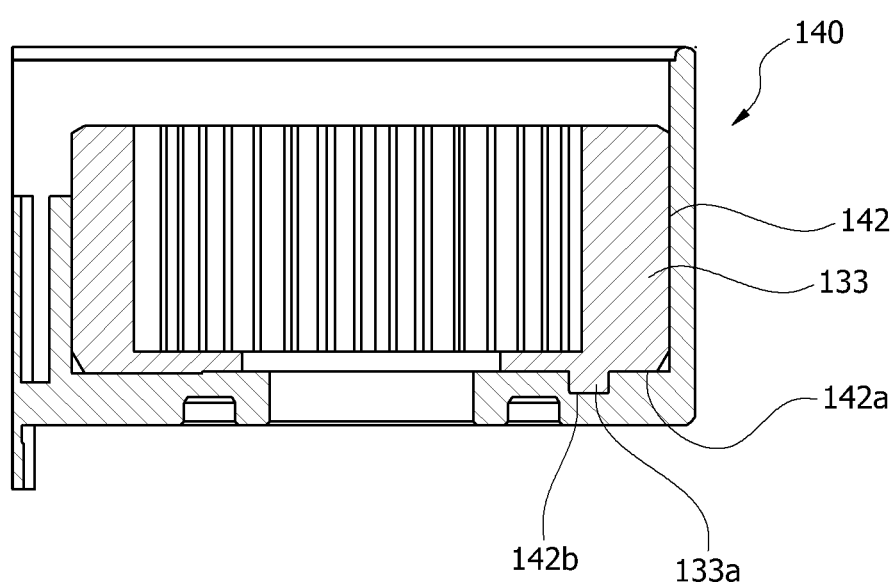
FIG. 5 is a cross-sectional view of the insertion protrusion is forcibly inserted into the insertion groove.

FIG. 4 is a view of the housing 140 mounted with the ring gear 133. FIG. 5 is a cross-sectional view illustrating of the insertion protrusion 133*a* is forcibly inserted into the insertion groove 142*b*. To allow forceful insertion, a diameter or size of the insertion protrusion 133*a* may be larger than a diameter or size of insertion groove 142*b*. The housing 140 may include a motor accommodating portion or seating recess 141 in which the motor 110 is accommodated and a ring gear accommodating portion or seating recess 142 in which the ring gear 133 is accommodated.

As shown in FIGS. 3 and 4, the ring gear 133 is immovably fixed to the ring gear accommodating portion 142, in which the insertion protrusion 133*a* may be formed on a bottom of the ring gear 133 to be fixed thereto. The insertion groove 142b, into which the insertion protrusion 133a is forcibly inserted, may be formed around an opening 142c on a bottom surface 142a of the ring gear accommodating portion 142.

According to one embodiment of the present disclosure, different from general ring gears manufactured through sintering, the ring gear 133 of the planetary gear set 130 is manufactured through injection molding, thereby forming a plurality of insertion protrusions 133a on the bottom of the ring gear 133.

In one embodiment, three insertion protrusions 133a may be formed to be arranged to be separate from one another at regular intervals along a circumferential direction on the bottom of the ring gear 133. Each of the insertion protrusions 133a may be formed to have a cylindrical shape. Corresponding to the insertion protrusions 133a, three insertion grooves 142b may be formed on the bottom surface 142a of the ring gear accommodating portion 142. The insertion groove 142b may be formed to be cylindrically concaved corresponding to the insertion protrusions 133a.

The present disclosure is not limited thereto and/or the shape and number of the insertion protrusions 133a and the insertion grooves 142b may be variously modified. To form the insertion groove 142b, the housing 140 may be injection-molded while a mold is being injected with a material including a synthetic resin.

As shown in FIG. 1, the housing 140 may include a gear cover 143 which covers the motor accommodating portion 141 and the ring gear accommodating portion 142 and a body cover 144 which covers the gear cover 143. The power transfer assembly 120 may be disposed between the gear cover 143 and the body cover 144. The idle gear 121 and the drive gear 122 may be rotatably installed.

A configuration according to one embodiment of the present invention disclosure in which the insertion protrusion 133a is forcibly inserted into the insertion groove 142b, thereby fixing the ring gear 133 to the housing 140 may reduce the occurrence of a gap and has advantages in a tolerance design of a housing. A coupling configuration between the insertion protrusion 133a and the insertion groove 142b is more easily assembled than general configurations of being inserted to slide.

The above-described parking brake actuator according to an exemplary embodiment of the present disclosure is formed through injection molding in which an insertion protrusion is formed on a bottom of a ring gear, an insertion groove is formed in a bottom surface of a ring gear accommodating portion of a housing, and the insertion protrusion is forcibly inserted into the insertion groove, thereby preventing a gap between the ring gear and the housing.

According to one embodiment of the present disclosure, the ring gear is formed through injection molding, thereby reducing manufacturing costs.

The present disclosure is directed to provide a parking brake actuator capable of preventing a gap between a ring gear and a housing of a planetary gear set.

The present disclosure is also directed to provide a parking brake actuator capable of reducing manufacturing costs.

One aspect of the present disclosure provides a parking brake actuator including a motor, a power transfer unit connected to an output shaft of the motor, a planetary gear set including a sun gear connected to the power transfer unit, a planetary gear engaged with the sun gear, and a ring gear engaged with the planetary gear and including an insertion protrusion formed on a bottom, and a housing including a motor accommodating portion in which the motor is accommodated and a ring gear accommodating portion in which the ring gear is accommodated, in which the ring gear accommodating portion includes an insertion groove formed on a bottom surface into which the insertion protrusion is forcibly inserted.

The ring gear may include the insertion protrusion having a cylindrical shape, and the ring gear accommodating portion may include the insertion groove having a cylindrical shape.

A plurality of the insertion protrusions and a plurality of the insertion grooves may be disposed along a circumferential direction to be separate from one another, respectively.

Three of the insertion protrusions and three of the insertion grooves may be disposed along the circumferential direction at regular intervals.

The ring gear may be formed through injection molding.

The housing may include a body including the motor accommodating portion and the ring gear accommodating portion, a gear cover which covers the motor accommodating portion and the ring gear accommodating portion, and a body cover which covers the gear cover.

A rotating shaft of the motor and a rotating shaft of the sun gear may be disposed in parallel while being separate from each other.

The power transfer unit may be disposed in an accommodating space formed by the gear cover and the body cover.

The power transfer unit may include an idle gear engaged with a pinion gear coupled with the output shaft of the motor and a drive gear engaged with the idle gear simultaneously with being connected to the sun gear.

The drive gear and the sun gear may be coupled with each other as a double gear on the same shaft.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A parking brake actuator comprising:
   a motor;
   a power transfer gearing connected to the motor;
   a planetary gear set connected to the power transfer gearing; and
   a housing inside of which the motor, the power transfer gearing, and the planetary gear set are provided,
   wherein the planetary gear set comprises a sun gear connected to the power transfer gearing, a planetary gear engaged with the sun gear, a carrier that supports the planetary gear, and a ring gear engaged with the planetary gear, wherein the ring gear includes a gear body with ring gear teeth and an axial end portion protruded from the gear body, wherein the axial end portion includes a first hole provided at a center and a protrusion provided on an axial end surface on an output side of the ring gear, and wherein a diameter of the first hole is smaller than an inner diameter of the gear body, wherein the housing includes a second hole and a groove, and the protrusion is inserted into the groove to fix the ring gear to the housing, wherein a diameter of the protrusion is larger than a diameter of the groove.

2. The parking brake actuator of claim 1, wherein the housing comprises a body, a gear cover and a body cover, and wherein the body comprises a motor accommodating portion and a ring gear accommodating portion, the gear cover covers the motor accommodating portion and the ring gear accommodating portion, and the body cover covers the gear cover.

3. The parking brake actuator of claim 2, wherein a rotating shaft of the motor and a rotating shaft of the sun gear are disposed in parallel while being separate from each other.

4. The parking brake actuator of claim 3, wherein the power transfer gearing is disposed in an accommodating space formed by the gear cover and the body cover.

5. The parking brake actuator of claim 4, wherein the power transfer gearing comprises an idle gear and a drive gear, and wherein the idle gear is engaged with a pinion gear coupled with the motor, and the drive gear is engaged with the idle gear.

6. The parking brake actuator of claim 5, wherein the drive gear and the sun gear are coupled to each other on a common shaft.

7. The parking brake actuator of claim 1, wherein a diameter of the second hole of the housing smaller than the diameter of the first hole of the ring gear.

8. The parking brake actuator of claim 1, wherein the motor is disposed so as to be overlapped with the ring gear in a direction perpendicular to a rotation axis of the motor.

* * * * *